United States Patent
Rooke et al.

[11] 3,838,763
[45] Oct. 1, 1974

[54] CONTAINER LOADING ARRANGEMENTS

[75] Inventors: Sydney W. Rooke; Alan Grice; Malcolm F. Davey, all of Kent, England

[73] Assignee: Sovex Limited, Erith, Kent, England

[22] Filed: Aug. 22, 1972

[21] Appl. No.: 282,817

[52] U.S. Cl............ 198/20 R, 198/24, 198/31 AC
[51] Int. Cl............................................ B65g 47/00
[58] Field of Search...... 53/164, 61; 198/24, 31 AB, 198/31 AC, 33 AA, 33 AC, 20, 21; 271/68, 177, 180, 181; 193/43 R; 214/6 G, 7

[56] References Cited
UNITED STATES PATENTS

| | | | |
|---|---|---|---|
| 1,734,868 | 11/1929 | Milne | 198/33 AC |
| 1,747,465 | 2/1930 | Cameron | 198/31 AC |
| 1,824,413 | 9/1931 | Stein | 198/31 AC |
| 2,795,312 | 6/1957 | Howdle | 198/31 AC |
| 2,809,741 | 10/1957 | Keilig | 198/165 X |
| 3,179,223 | 4/1965 | Lang et al. | 193/43 R |
| 3,462,001 | 8/1969 | Boyce | 198/165 |
| 3,552,089 | 1/1971 | Bushnell | 53/159 X |
| 3,708,947 | 1/1973 | Green et al. | 53/61 X |

*Primary Examiner*—Evon C. Blunk
*Assistant Examiner*—Joseph E. Valenza
*Attorney, Agent, or Firm*—Fred Philpitt

[57] ABSTRACT

An article handling apparatus particularly for loading aircraft baggage containers comprising a pair of loading stations each provided with means to receive a plurality of articles marshall them into groups of predetermined size and discharge successive groups, the apparatus being equipped with means to direct successive incoming articles selectively to either one of the stations for marshalling and assembly into groups. Parts of the marshalling and group assembly means act as guides during the discharge of each group and the apparatus has means which ensure that each article is fed automatically to the selected loading station in its correct orientation.

8 Claims, 16 Drawing Figures

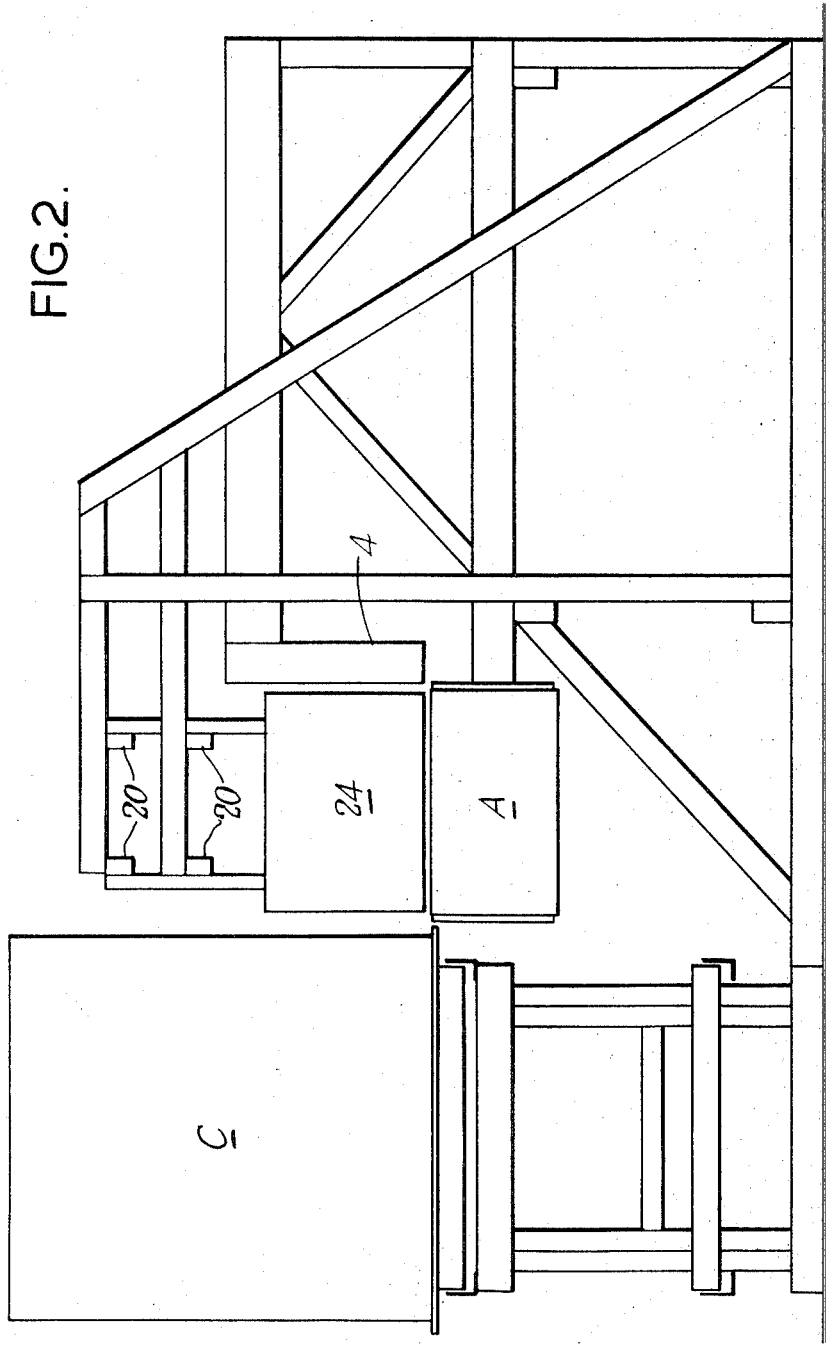

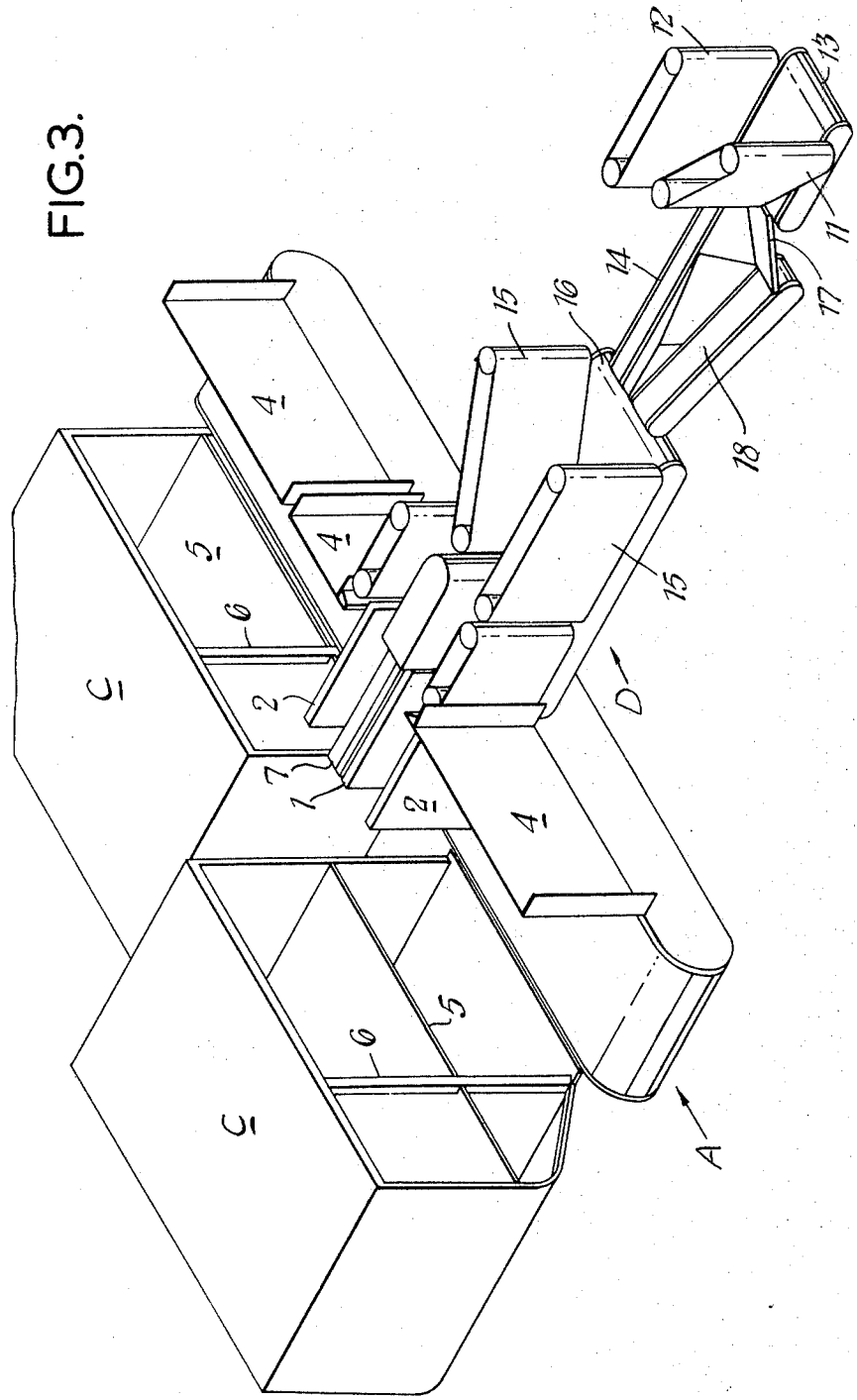

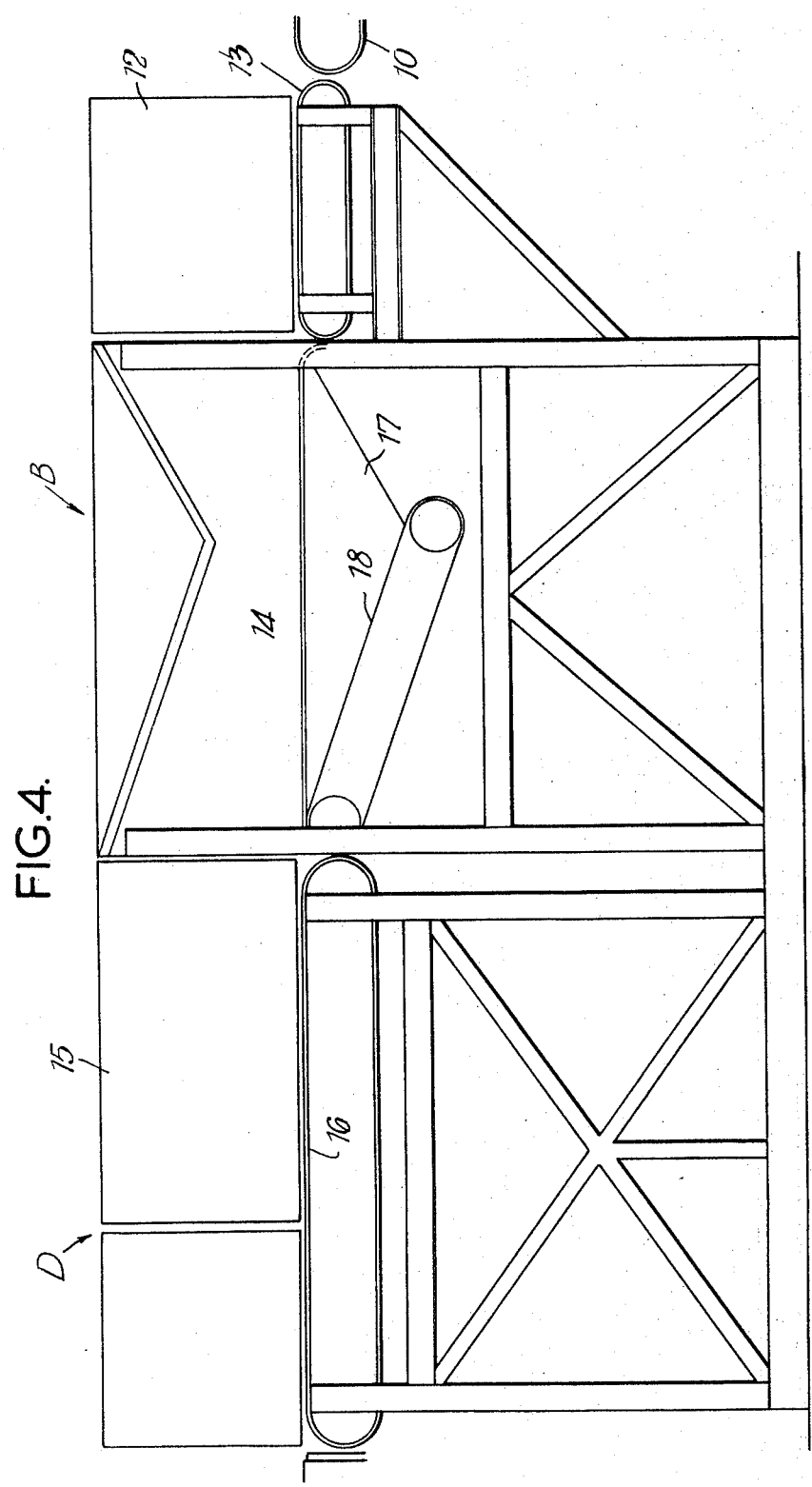

CONTAINER LOADING ARRANGEMENTS

This invention relates to article handling apparatus and especially to the loading of containers principally intended for carrying baggage on board aircraft and which are typically generally rectangular in shape with a shelf and which may have one corner shaped to permit easier handling and stowage.

The containers may have a vertical pillar or other divider intersecting the shelf, and in certain instances they may be used to receive palletised loads of uniform height.

According to the invention there is provided article handling apparatus comprising two loading stations each provided with means to receive individual articles and discharge a plurality of said articles assembled into a group of predetermined dimension, the second loading station extending co-linearly with the first said loading station, pusher diverter means being arranged to be movable linearly along each station over each said supporting surface, each loading station comprising an article supporting surface extending in the direction of said predetermined dimension and supporting guide means extending longitudinally parallel to said surface, said apparatus including marshalling said accumulating means being provided with a back plate and a pusher diverter means, each of which is linearly displaceable along said guide means and between which the group of articles is assembled, means to guide successive articles to one side of said pusher diverter means and means to discharge the assembled group of articles from said loading station in a direction at right angles to the said predetermined dimension.

Preferably the loading station is arranged to handle two containers at any one time and lifting means are provided in order to raise and lower each container depending on whether its upper or lower region is to be loaded. In this manner, each container loader will have two loading positions on the same level and in the same straight line. The baggage, travelling in the direction of its length and standing up, is fed into the loader between the two loading positions. They layout of the loader in plan is like the letter 'T' with the baggage travelling inwards along the stem of the 'T' and the two loading positions forming the cross piece of the 'T.'

One loading position loads the bottom of the container whilst the other loading position loads the shelf. Except for the first and last containers in any series of containers, there are always two containers in process of loading at any one time.

The articles to be loaded are marshalled and accumulated into groups or "slugs" each slug corresponding to the length of a shelf or the container bottom and are transferred into the container by a ram which is preferably operated hydraulically or pneumatically.

The containers are standard and are fitted with a shelf at approximately half the height of the container. The baggage is carried on the shelf and on the bottom of the container in two parallel rows at each level with the length that is the longest dimension, of the baggage across the width of the container.

The shelf runs the full length and width of the container but the bottom is reduced in area because the container has one lower corner cut off across its width. From this end of the bottom, two pillars rise the full height of the container, one pillar on either side of the container, and they divide the shelf into two unequal lengths.

Each container holds about 50 pieces of baggage of average size and the baggage has to be handled at a rate of about 30 per minute, ideally the maximum size of each piece of baggage is 29 inches by 19 inches by 9 inches excluding handles and hinges.

An embodiment of the arrangement will now be described with reference to the accompanying drawings which illustrate a typical layout and in which:

FIG. 2 is a side elevation of the arrangement showing the loading station;

FIG. 3 is a schematic perspective view of the arrangement shown in FIGS. 1 and 2 with some parts omitted for clarity;

FIG. 4 is a side elevation of the article orienting section of the arrangement;

Figure 1A:
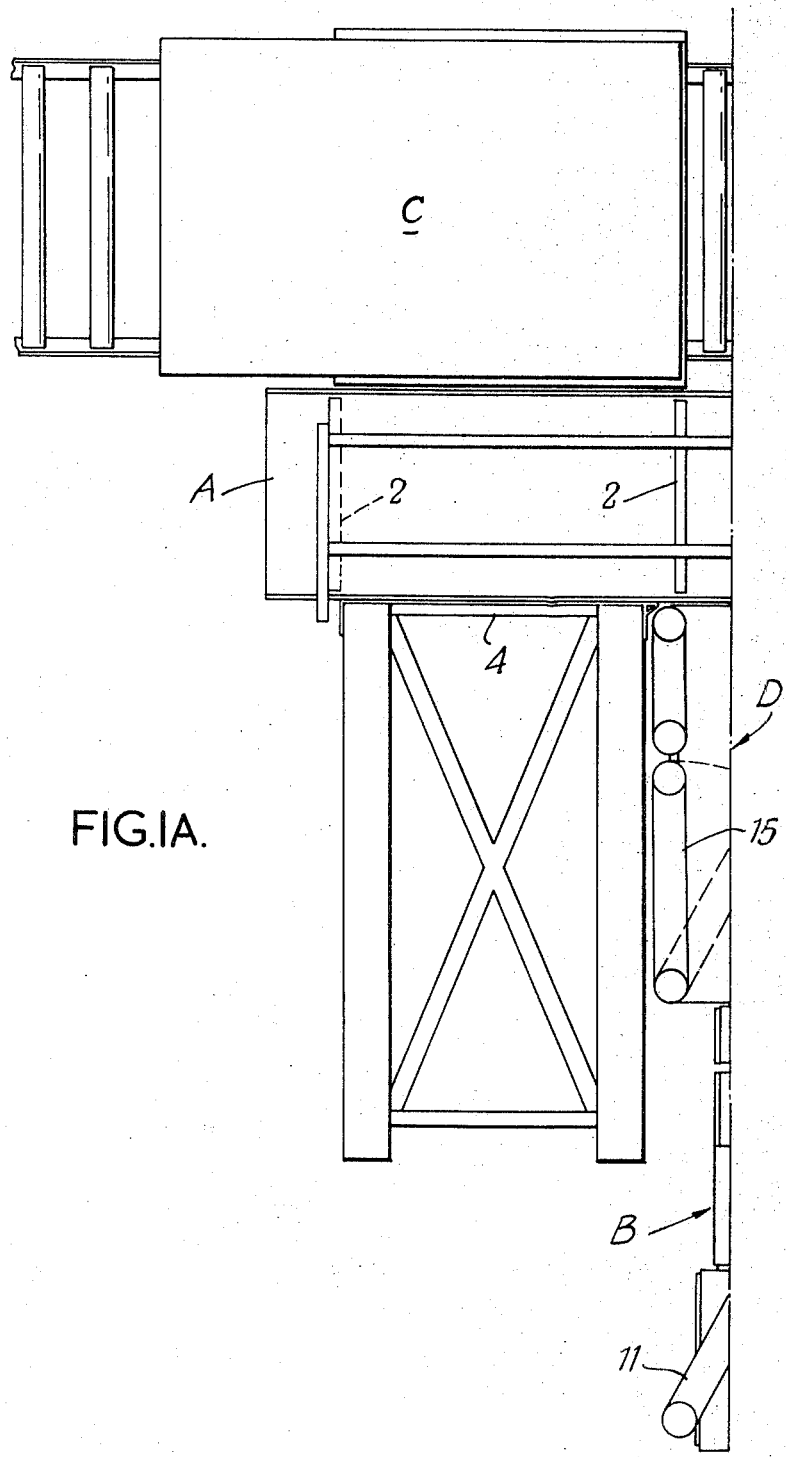
FIGS. 1A and 1B show the container loading arrangement in plan view.

The containers C enter the loader arrangement shown in FIG. 1A and are raised to a suitable height by lifts (not shown) to bring the bottom of the container level with the loading stage A position as shown in FIGS. 2 and 3. When the bottom level of the first container is full, the container is lowered and moved across the face of the loader in the direction indicated so that the container shelf is now opposite the loading stage A in the loading position of FIG. 1B. At the same time, a second, empty container C now enters the loader on its conveyor and is brought to rest in its raised position by the lift, that is with the bottom of the container opposite the first loading position (FIG. 1A).

There are now two containers in the loader and baggage can be fed alternately to the bottom of the second container and to the shelf of the first as shown in FIG. 3.

The containers are moved, for example, on conveyors, past the loader as required by the process of loading, scissors lifts (not shown) being used for changing the level of the containers.

When the shelf of the first container C is filled, this container now being filled with baggage on both levels is moved clear of the loader by its conveyor to be picked up by a dolly or other transport means. At the same time, the second container C moves across and down into the position previously occupied by the first container, whilst a third container moves into the upper position previously occupied by the second container, the sequence being repeated for successive containers.

Each piece of baggage entering the loader travelling in the direction of its length and standing upright, passes into the space on the loading stage A on the selected side between a pusher diverter 1 and a travelling back plate 2 associated with each loading station. When the piece of baggage has fully entered this space, the pusher 1 makes a stroke parallel to the direction of container travel equal to the thickness of the maximum size of article plus any necessary clearances and carries the bag against the back plate 2, each article thus travelling outwardly on the stage A at right angles to its direction of entry, the pusher diverter 1 and back plate 2 being movably supported on rails extending above the loading stages and provided with end stops 24 as shown which are aligned with the end of a container during loading.

Although the pusher diverter 1 always make the same length of stroke, the amount each back plate 2 moves depends only upon the thickness of the bag in contact with the pusher diverter. As the back plate 2 moves away from the pusher diverter 1, it carries with it the surface 3 (FIG. 6) on to which the bags are being pushed so that the bags only slide sideways for a very short distance. The back plate 2 is retained by a pawl or other like arrangement, so that it does not return at this stage.

As the bags enter the loader and are pushed sideways into the bottom loading position shown in FIG. 1A and FIG. 2, a "slug" of bags packed side by side will be built up. When the "slug" of bags equals the length of the bottom of the container C less clearances to allow the "slug" to enter the bottom the back plate 2 and the pusher diverter or an end plate associated therewith are arrested as predetermined positions with respect to the ends of the container, following which a ram 4, operating at right angles to the pusher diverter 1 and pushing the bags towards the open container in the direction of their length, comes into operation. As the "slug" enters the container pushed by the ram 4, it is guided at both ends between the back plate 2 and the pusher 1.

The first assembled "slug" of baggage to be pushed into either the lower or the upper region of the container travels across the whole width of the container and comes to rest against the side wall of the container furthest from the loading mechanism.

After the ram has pushed a slug into the container, it is retracted. The travelling back plate 2 is then allowed to return to the centre of the loader with the pusher diverter 1.

Figure 1B:
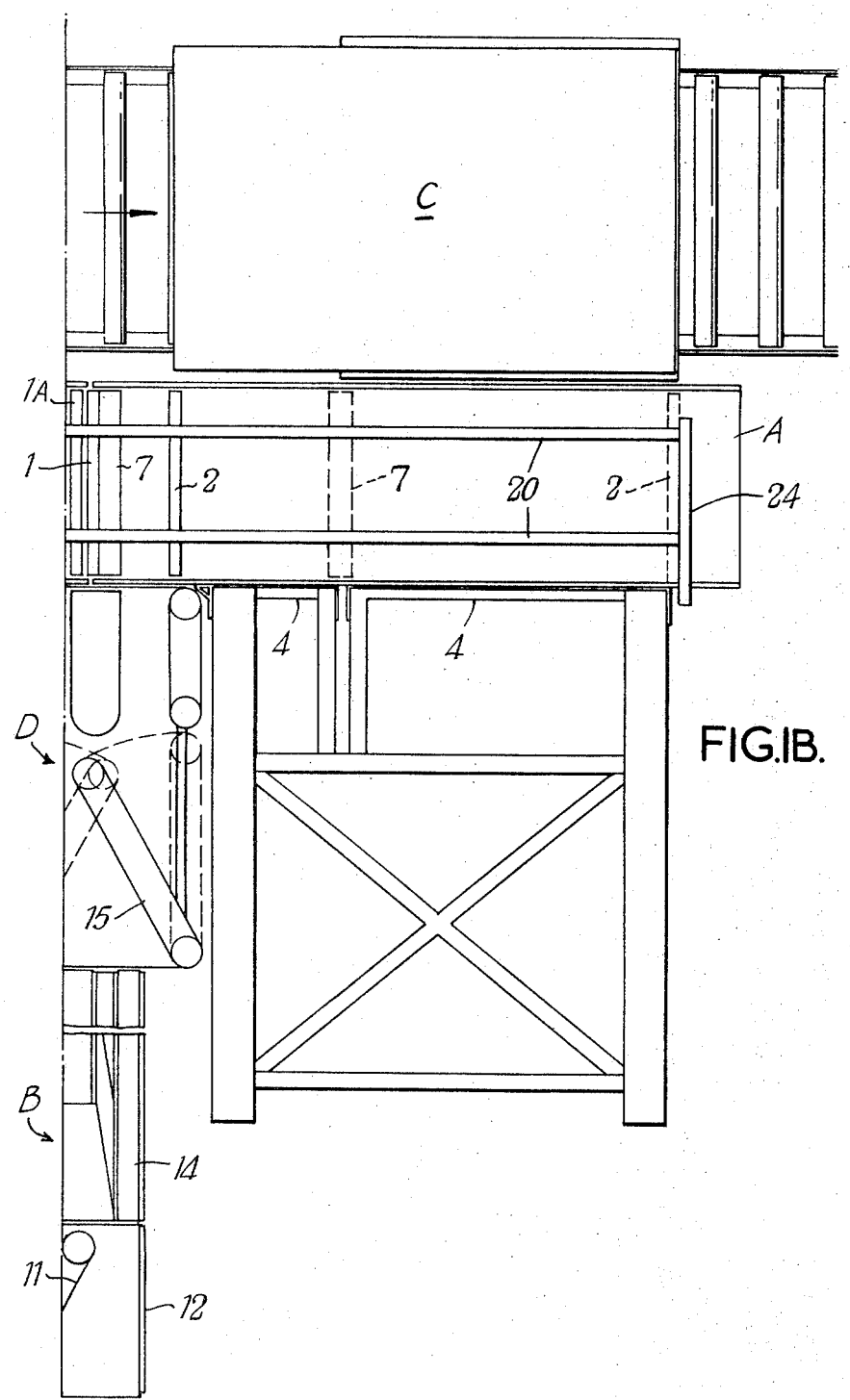
Figure 5:
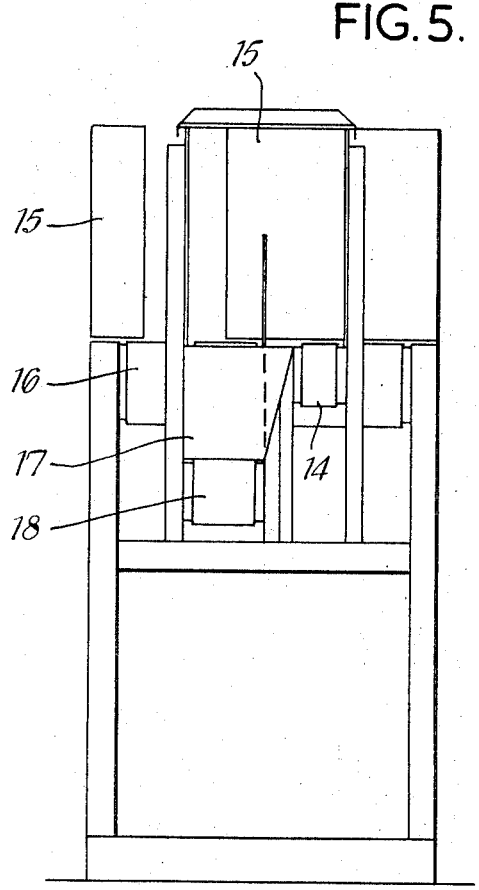
FIG. 5 is an end view of the arrangement taken on the line A—A of FIG. 3.

Whilst the ram 4 is pushing the baggage onto the bottom of the container, the incoming baggage is switched to the other side of the loader so that the other pusher diverter 1 can build up a "slug" of baggage in the shelf loading position as shown in FIG. 1B.

The incoming baggage will be immediately switched back to the bottom loading position as soon as the ram 4 at this position has retracted from pushing the first "slug" of bags to the far side of the container. As soon as the second "slug" of baggage has been built up for the bottom of the first container, this slug is pushed by the ram 4 into the container floor nearest the loader. As soon as this has been done, the container is lowered and moved on so that the shelf is opposite the shelf loading position.

Whilst the first container is being moved opposite the shelf loading position, the pusher diverter 1 on that side is building up a "slug" in the shelf loading position so that the stream of baggage going into the loader is never interrupted by the movement, or the loading of the containers.

The "slug" of baggage in the shelf loading position is built up by the pusher diverter 1 in exactly the same way as the "slug" in the bottom loading position. As the "slug" builds up, the travelling back plate 2 moves along the rails 20 away from the pusher diverter 1 taking the surface 3 on which the bags stand with it.

Figure 6:
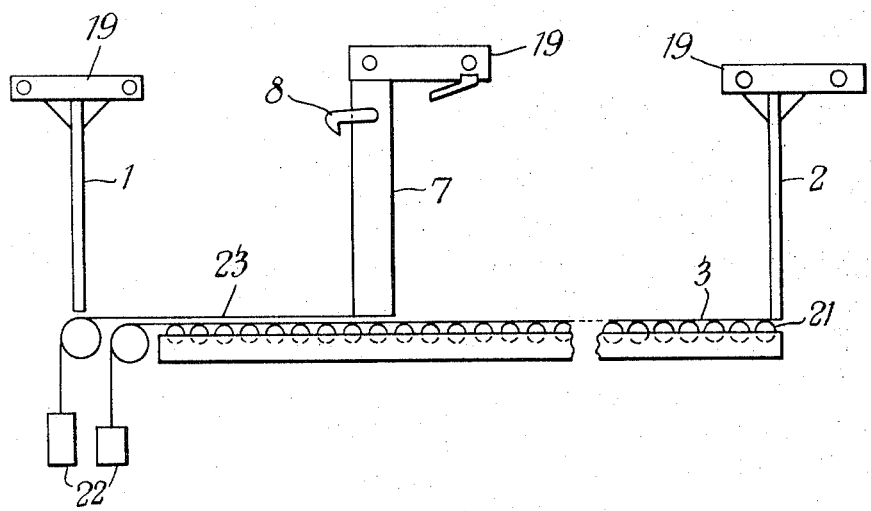
FIG. 6 is a schematic diagram of the marshalling and accumulating means.

In many of the containers to which this invention is applicable, the shelf 5 is divided as shown in FIG. 6 into two unequal lengths by pillars 6 in the container and the shelf loading position takes account of these pillars by means of a special spacing attachment 7 releasably latched to the face of one pusher diverter 1 as shown in FIG. 1B. When th "slug" of baggage has built up sufficiently to fill the shelf from the end of the container to the pillar 6, the spacing attachment 7 on the face of the pusher diverter 1, which is in the form of a narrow box rather wider than the pillar, is detached from the pusher by releasing the latch 8, so that the next piece of baggage is inserted between the face of the pusher diverter 1 and the spacing attachment 7.

When the "slug" of baggage for the shelf is complete, the attachment 7 is opposite the pillar 6 in the container. The ram 4, which pushes the "slug" onto the container shelf 5, is divided so that it passes on both sides of the spacing attachment 7, pushing the baggage before it and leaving the attachment 7 behind.

When the ram 4 retracts, the attachment 7 is carried back to the face of the pusher diverter 1 by the same type of mechanism that returns the travelling back plate 2.

As FIGS. 8 to 10 in conjunction with FIG. 3 illustrate, the operation of the apparatus when loading the container shelf in a typical embodiment is as follows.

Figure 8:
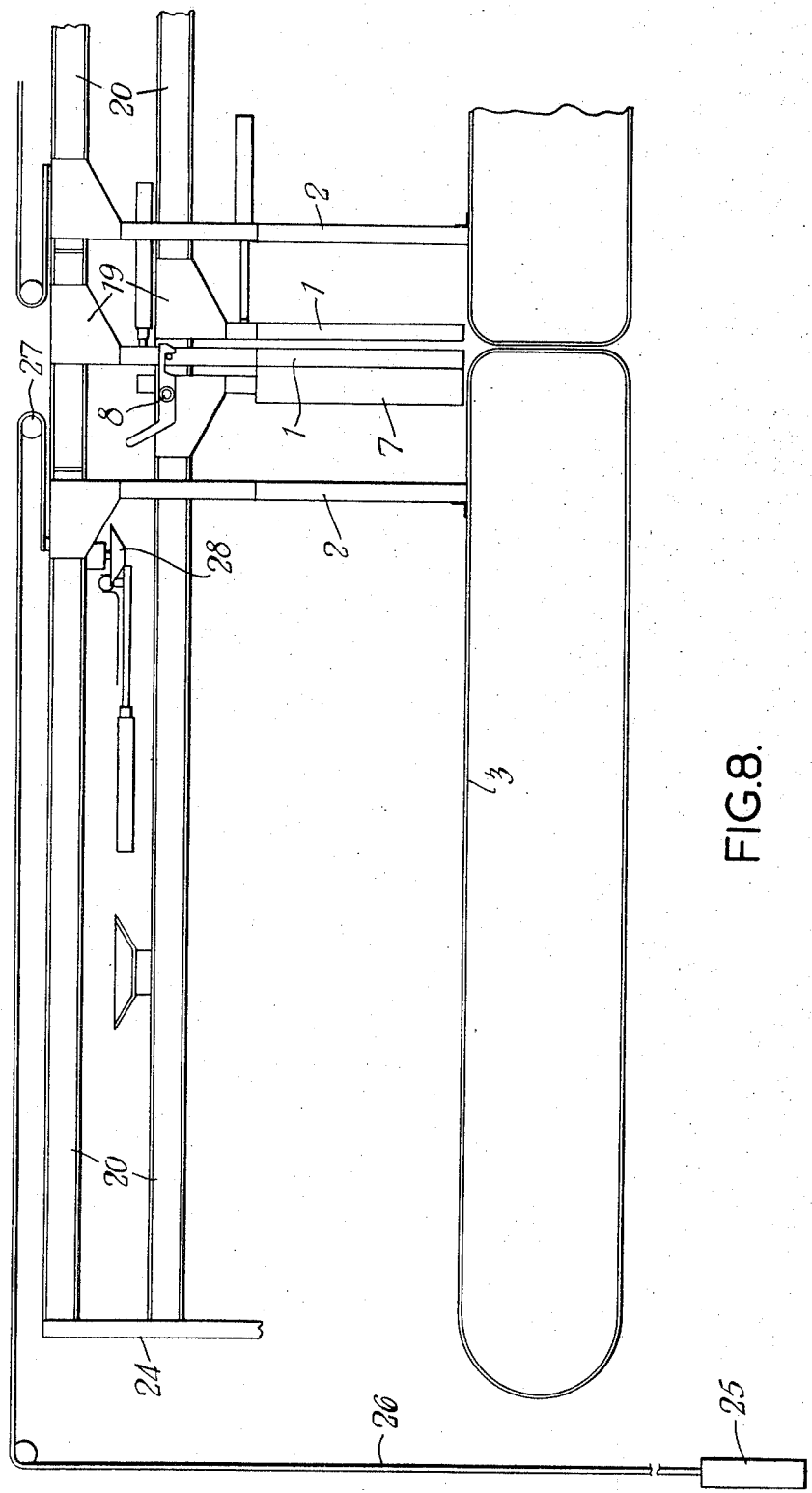
FIGS. 8 to 10 are side elevations showing the sequence of operations in one embodiment of the apparatus seen from the discharge side of the apparatus.

The mechanism before loading commences is shown in FIG. 8 which shows the pusher diverters 1 in their central positions, being carried on trolleys 19 guided on the rails 20.

Spacer attachment 7 is also guided on the rails 20 and is releasably latched to one of the pusher diverters 1 by the latch 8. Baggage is first fed between the spacer 7 and the back plate 2, each stroke of the pusher actuator being greater than the maximum thickness of the articles being handled. Back plate 2 is connected to the surface of band 3 so that as the articles are moved outwardly from the centre, they do not have to slide but are carried on a movable surface, so avoiding damage. The back plate 2 is connected to a weight 25 by means of a chain 26 and a free wheel arrangement 27 and FIG. 9 shows how, as the "slug" of baggage is built up the weight 25 is raised.

Figure 9:
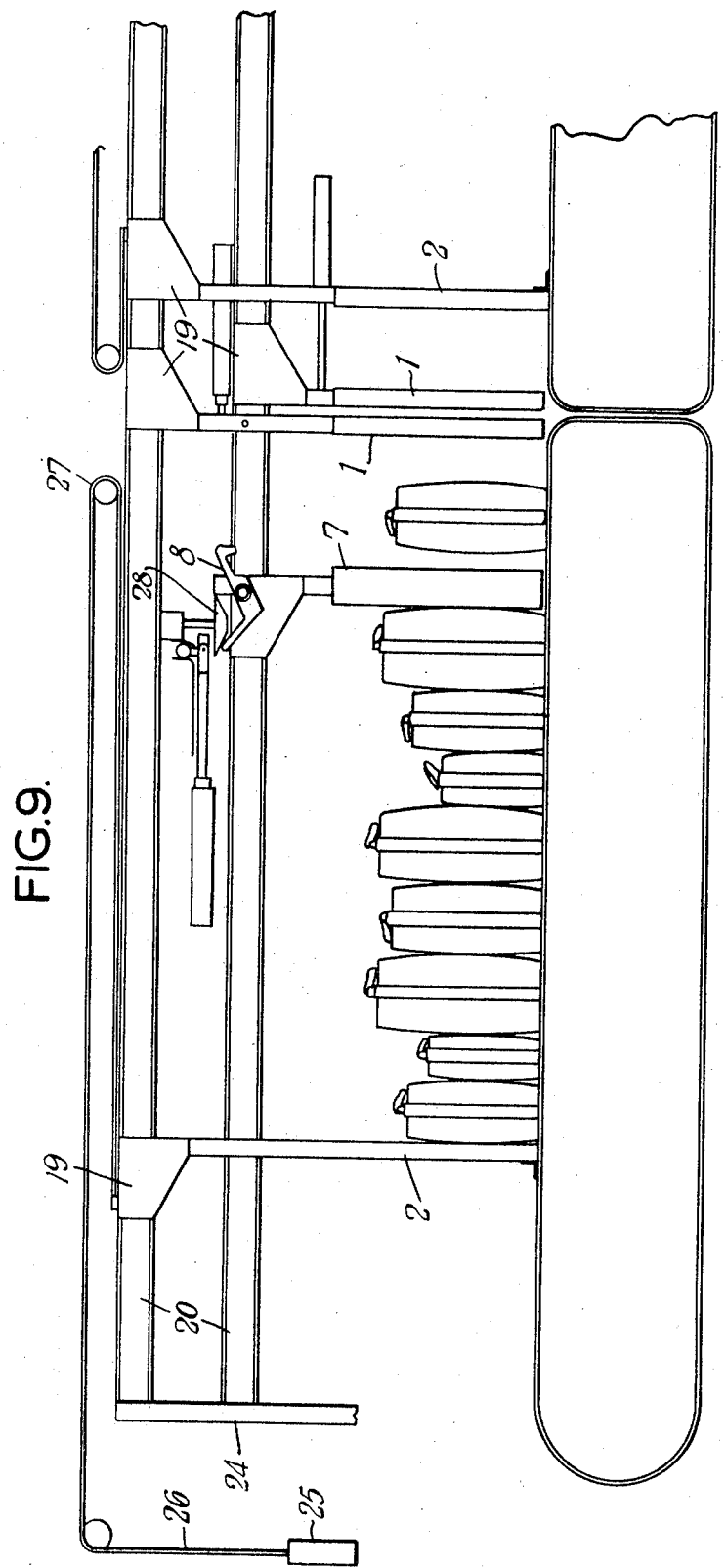
Figure 10:
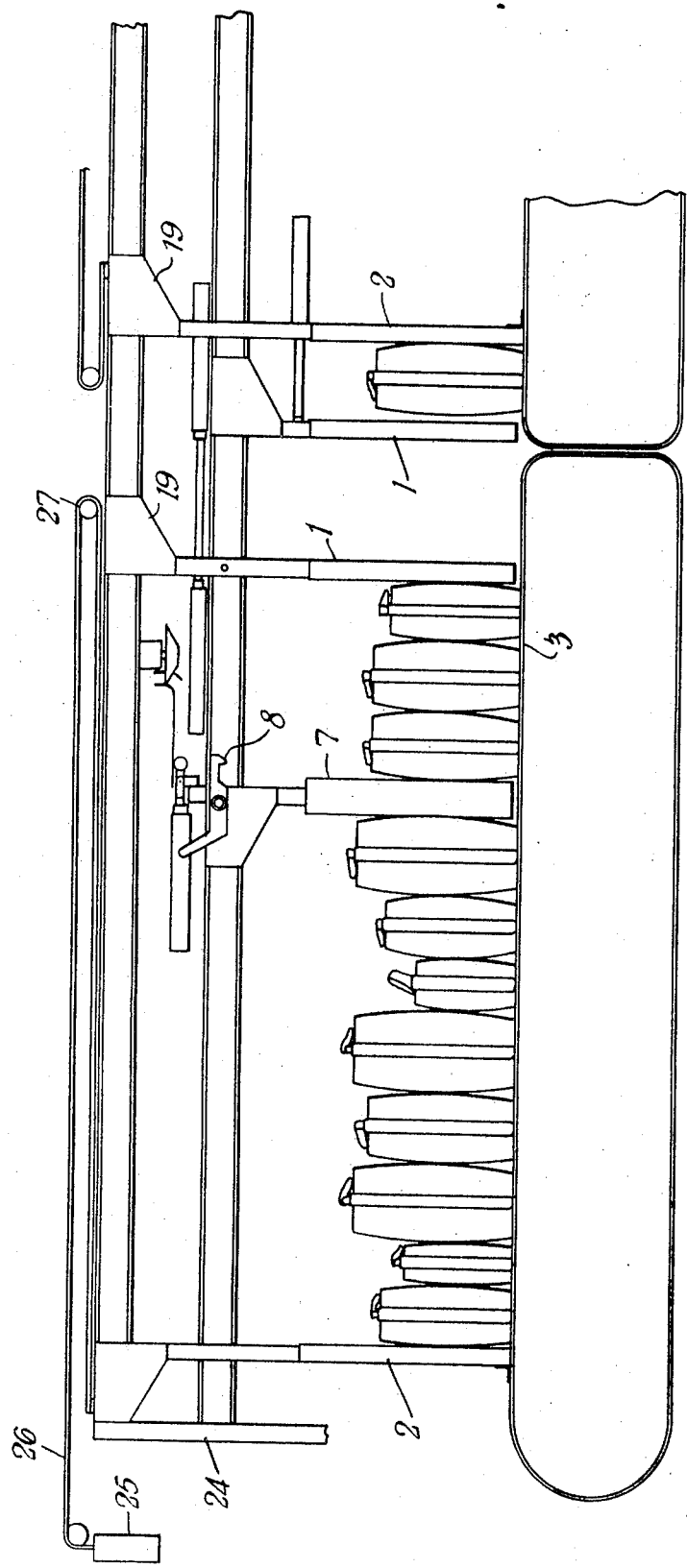

As FIG. 9 also shows, when the length of slug built up approaches the length of the shelf between one end and the pillar 6, the spacer 7 is released from the end plate 30. This is achieved by means of the unlatching ramp 28 which releases the latch 8 and the end plate 30 is retracted with the pusher.

Further bags are then successively inserted between the pusher diverter 1 and the spacer 7 until the total desired length of the slug has been assembled with the spacer 7 located opposite the container pillar 6. To ensure correct location of the spacer attachment 7, the positioning ram 29 is operated to pull the spacer attachment 7 into its required position.

The two parts of the divided ram 4 are then actuated and the complete slug is pushed onto the container shelf on either side of the pillar 6, the back plate 2, the spacer 7 and the pusher diverter 1 acting as guides.

The sequence for assembling a slug of baggage for the lower compartment of the container is similar with the exception that the spacer attachment 7 and its associated latching and positioning arrangements are omitted.

As soon as the baggage has been pushed off the stage A the freewheel device 27 releases the weight 25 and this descends, pulling the back plate 2 back towards the position shown in FIG. 8.

Figure 7:
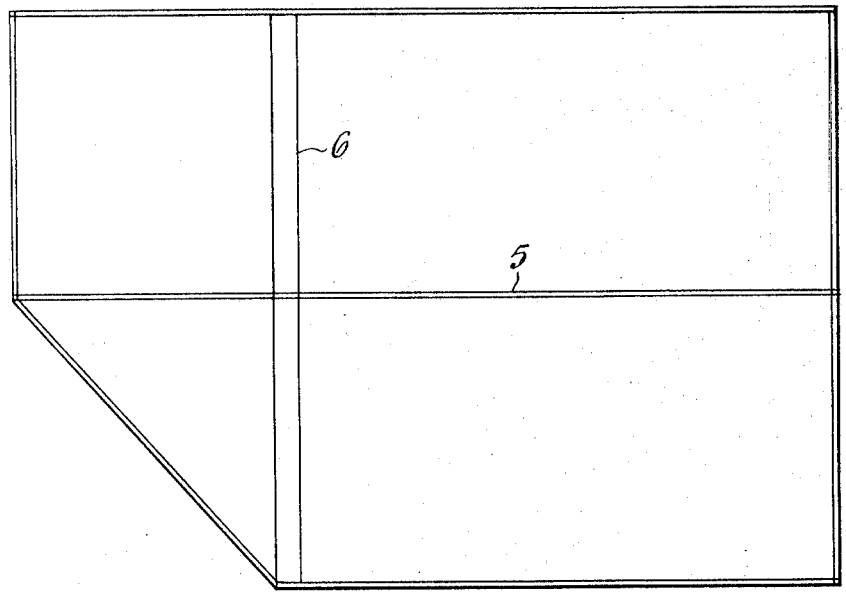
FIG. 7 is a side elevation of a typical container.

Whilst the flow of baggage into the loader is maintained and there is a continuous supply of empty containers being brought up to the loader, the loader will continue to operate entirely automatically. However, for the last of a series of containers, the loader must be brought under manual control especially if the last container is going to be incompletely filled with baggage. In this case, there will be a last "slug" of baggage which may be for either the container bottom or the shelf and which is likely, itself, to be incomplete when the flow of baggage into the loader ceases. When this occurs, provision would be made to drive the back plate 2 out under manual control to its maximum position away from the pusher diverter 1 against the end stop 24. The ram 4 can then operate to push whatever baggage there is in the "slug" into the container C. After the ram 4 has retracted, the container can be moved by manual control to the point where it can be loaded onto a dolly. The loader is then ready to deal with another series of containers. The triangular corner region usually present in the container and visible in FIG. 7 is filled manually and can accommodate non-standard or out-of-gauge baggage.

Figure 11:
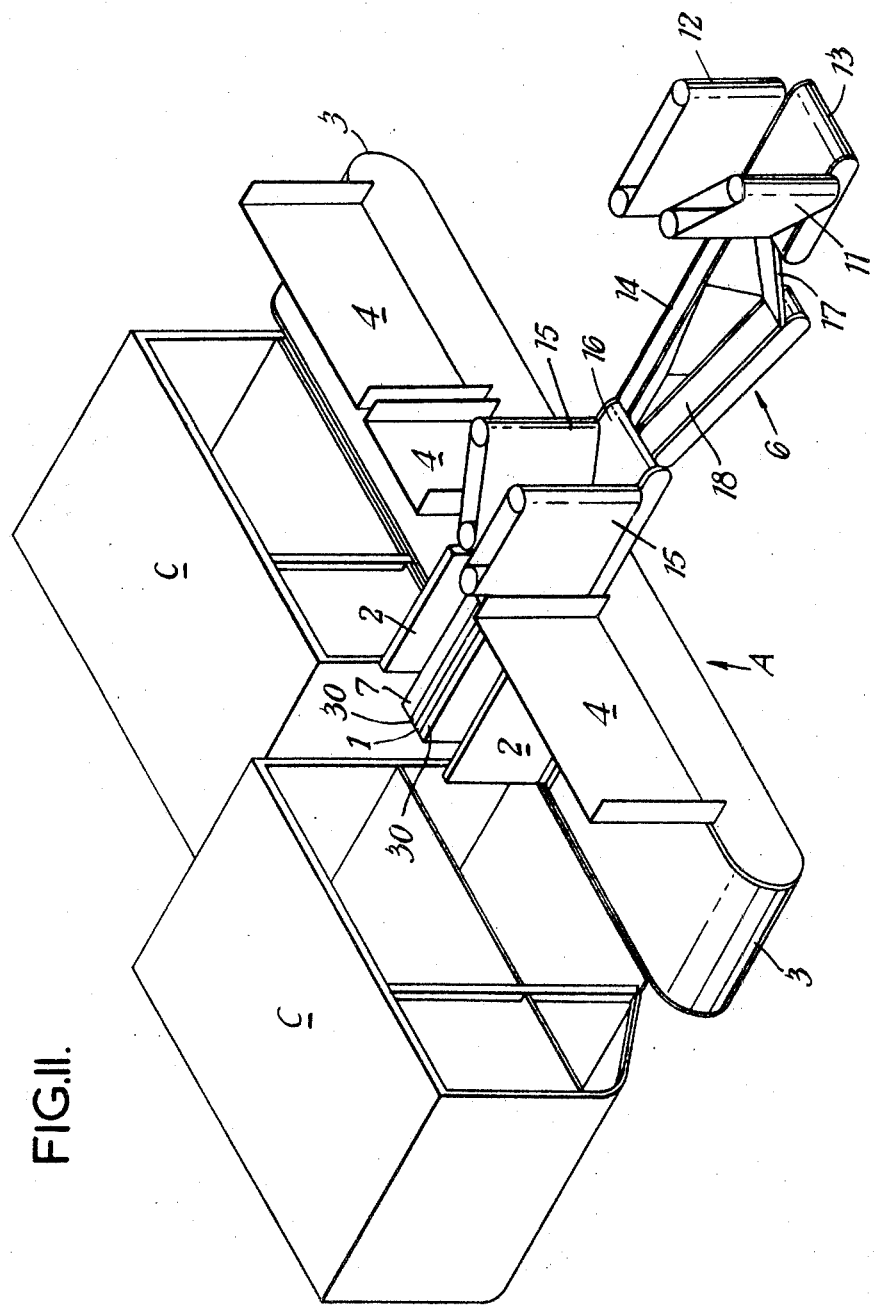
FIGS. 11 to 15 are views similar to FIGS. 8 to 10 showing a second embodiment of the apparatus.
Figure 12:
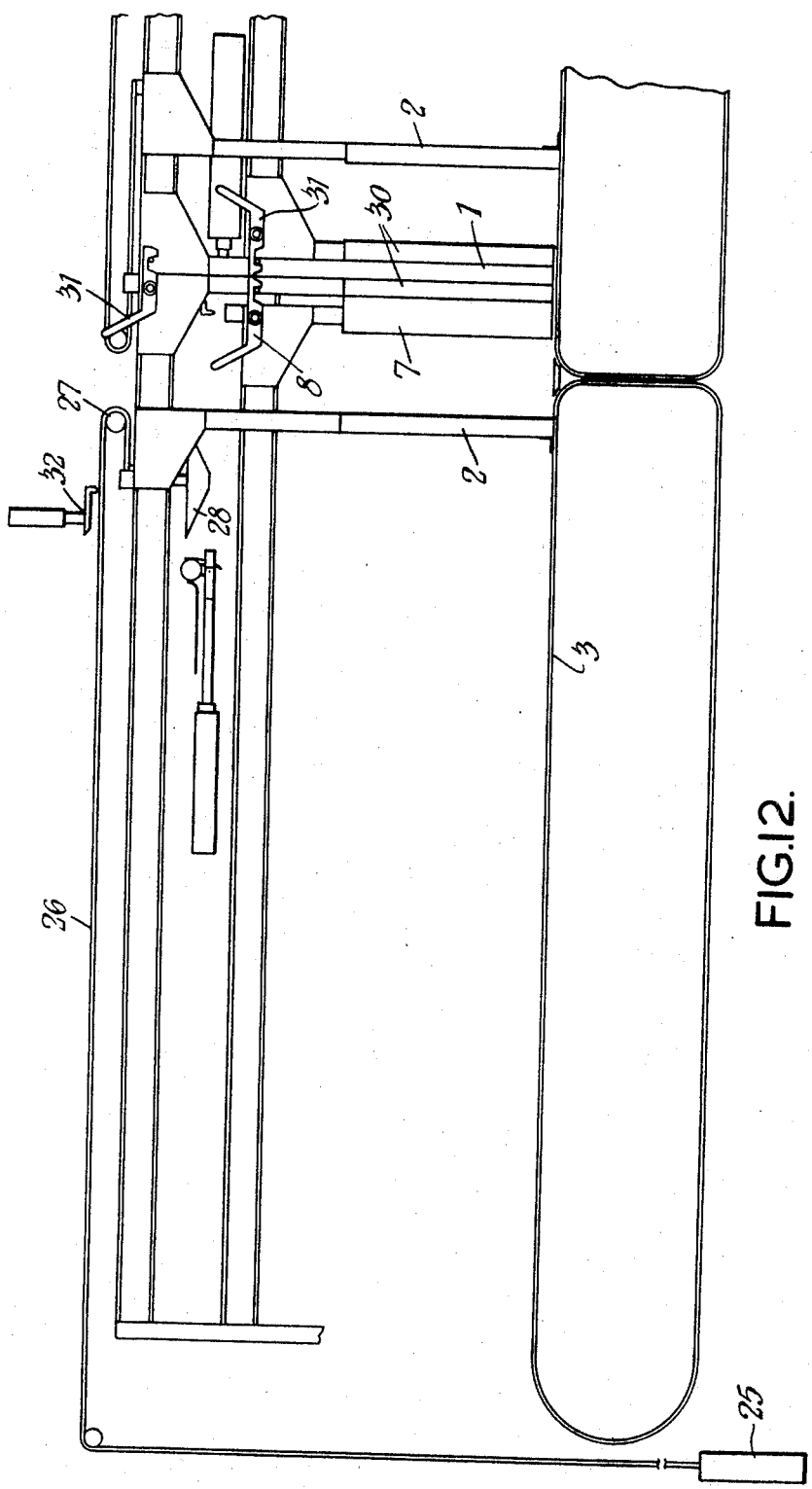
Figure 13:
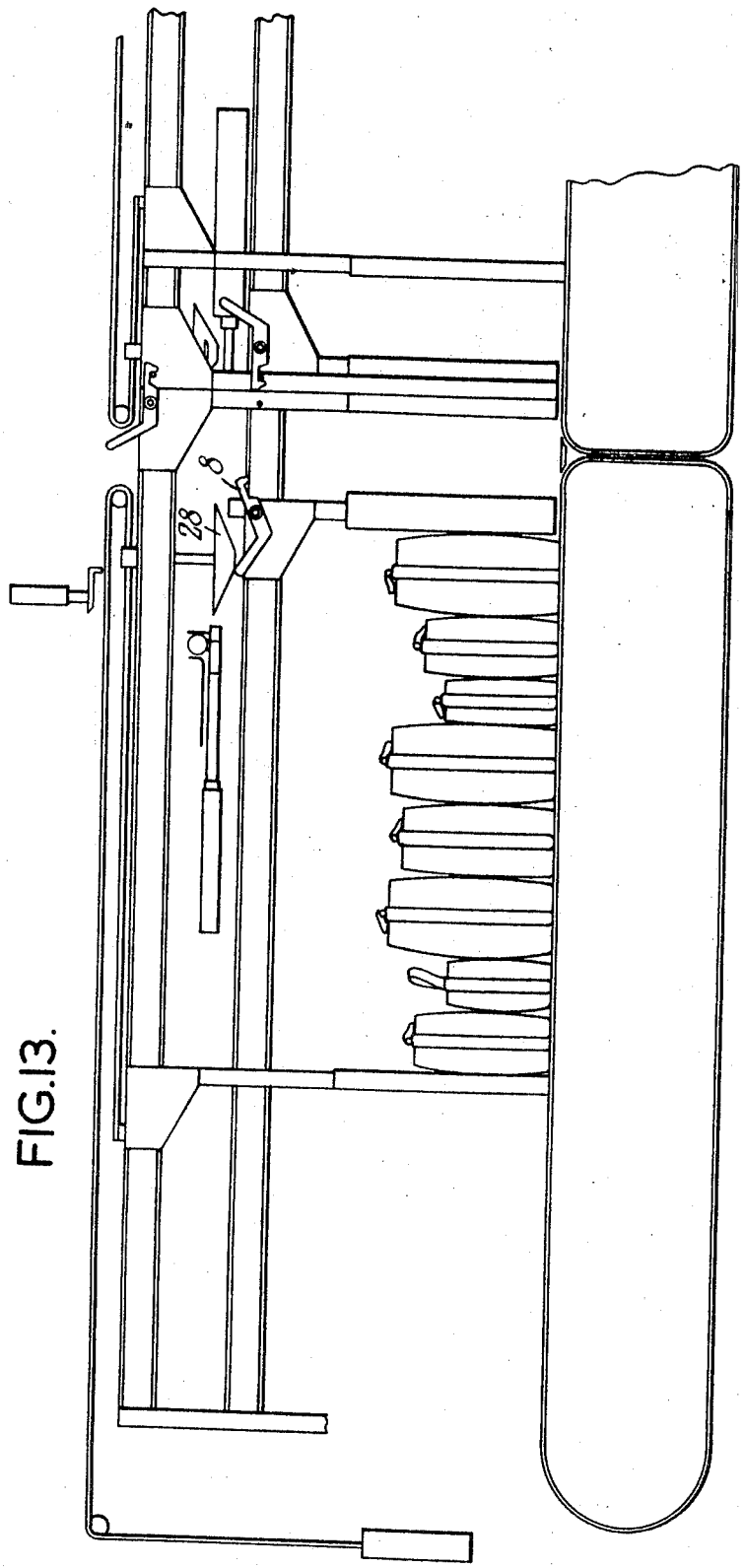
Figure 14:
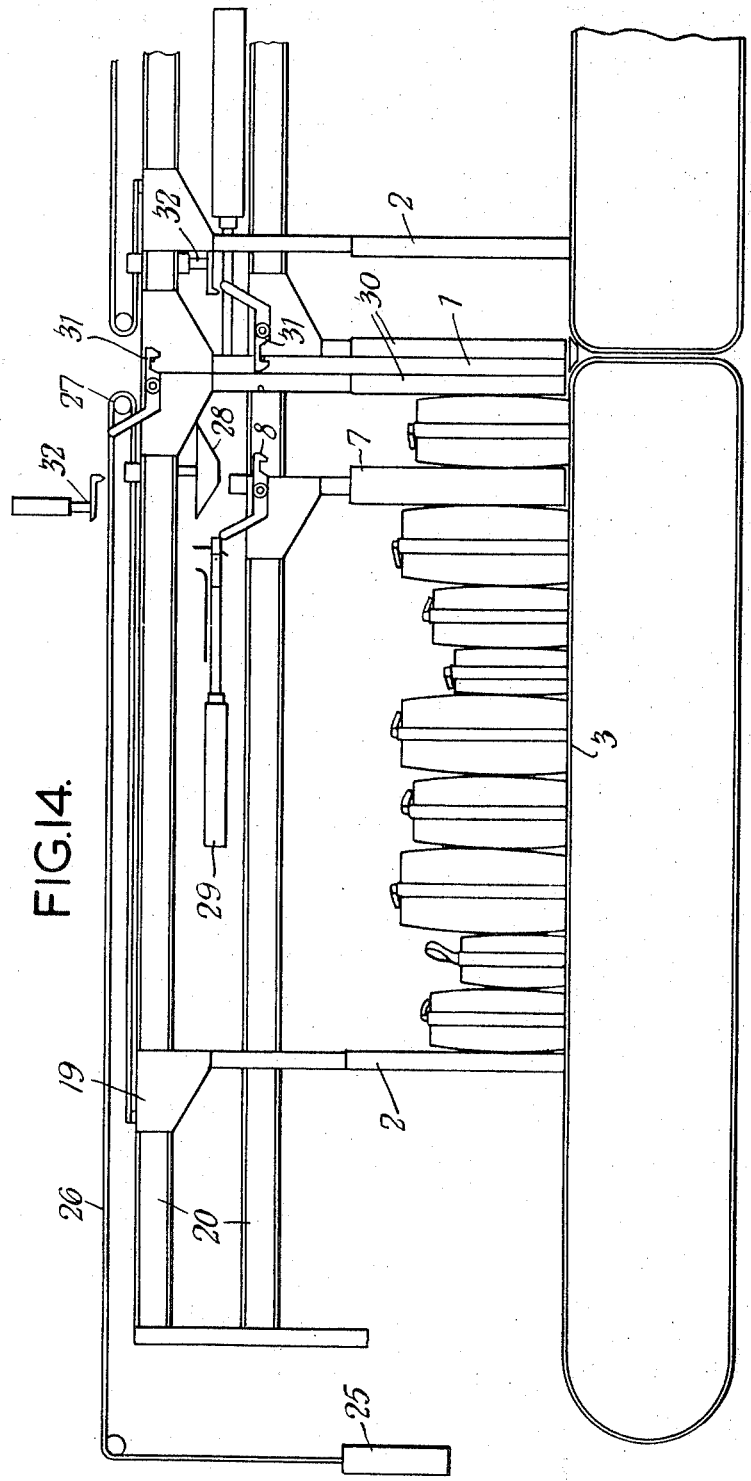
Figure 15:
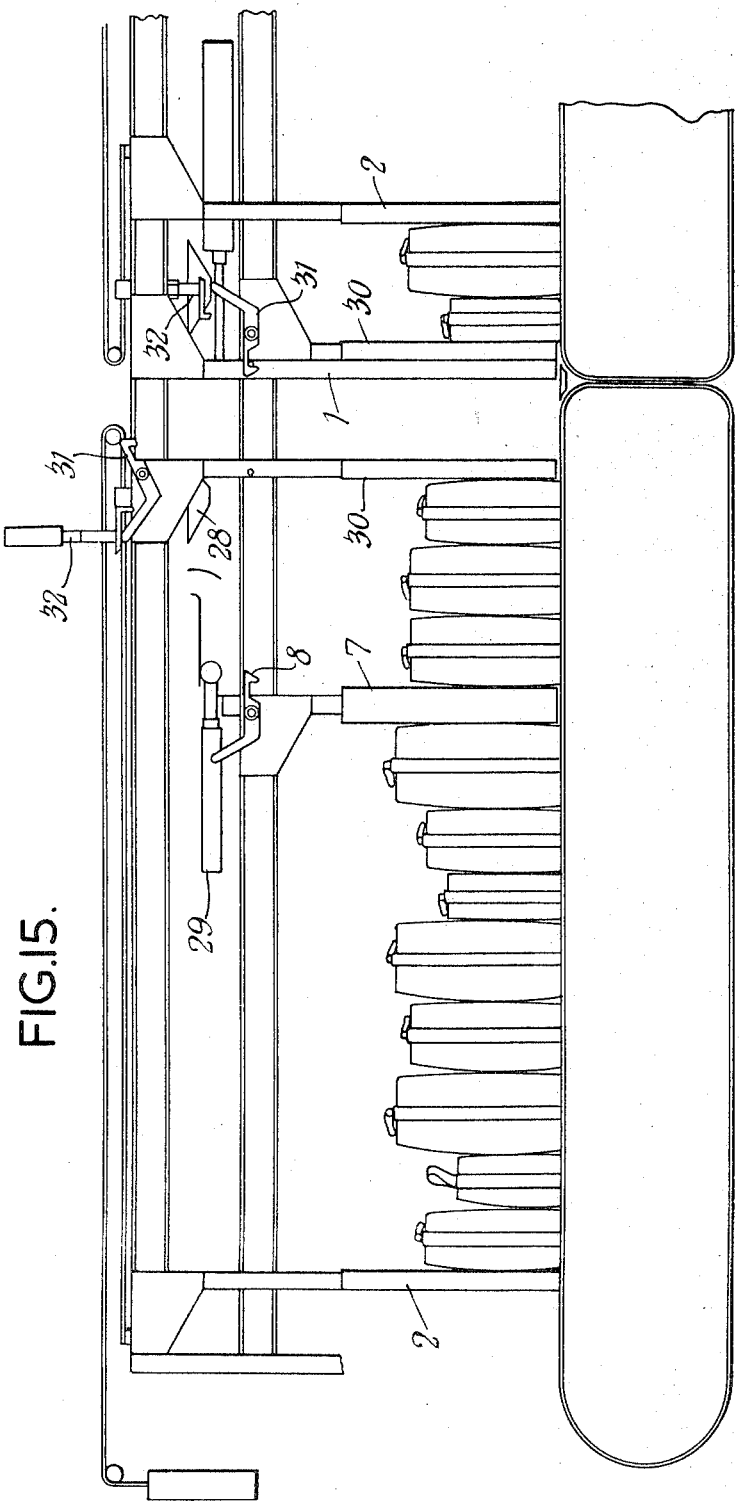

In another embodiment of the baggage handling apparatus, illustrated in FIG. 11, the switch section is modified by the omission of the central plough or watershed and its associated belt ploughs, one of the two belt ploughs 15 being pivotable and the pusher diverter being operated to receive incoming articles on its appropriate side of the loading stage A depending on which container region is to be loaded, the pivotable plough 15 being deflected laterally by articles as they are fed to the pusher diverter to measure the thickness of each article.

In this embodiment, and as illustrated with particular reference to FIGS. 11 to 15 articles are always fed to the same point of the loading stage A. The pusher diverter is provided with two end plates 30, the pusher diverter and the end plates 30 being latched together by latches 31, the pusher operating selectively in either direction carrying the end plates 30 with it so long as the latches 31 are engaged.

The spacer attachment 7 is unlatched by the action of the ramp 28 on the latch 8, and further baggage continues to be assembled until at the appropriate point when the slug of baggage is at its correct size, the lock 32 separates to release the respective latch 31 and retain the associated end plate 30 in line with the adjacent end of the container being loaded at that station.

The pusher diverter is now operated to build a slug of baggage on its other side in a similar manner, although on this side the spacer 7 and its associated mechanisms are omitted and the loading ram 4 is a single unit, not divided into two parts as for the side having the spacer attachment 7. As is the case of the embodiment shown in FIGS. 8 to 10, this embodiment is also provided with a positioning ram 29 which ensures that the spacer attachment 7 is correctly positioned opposite the container pillar 6.

In each embodiment of the invention, means can be provided so that over the last 9 inches, for example, of back plate movement in each stage, the back plate operates a rheostat or like arrangement in such a way that the output voltage or signal is compared with the output of a measuring unit to determine whether the available gap is sufficient to receive the next article of luggage or not.

An important part of this invention is the inclusion of means to ensure that the articles of baggage are fed to the loader in the upright position and travelling in the direction of their length.

It is assumed that the baggage is brought up to the installation of a 1 ft. 9 inch wide belt conveyor 10 (FIG. 4) and that the baggage is travelling either standing up, as it has been placed on the conveyor by the loaders, or lying on its side, if the baggage has fallen over during transit. It is further assumed that there will be no overlap between consecutive articles.

On arrival at the loader, the baggage will first be speeded up by providing an appropriate relative speed differential between the conveyors 10 and 13, to increase the gap between one piece of baggage and the next. Any baggage standing upright will be pushed over by a constant pressure plough 11, which has, for example, a driven belt face to minimise loss of speed and wear, so that it is standing upright against the side plate 12 of a conveyor 13. All such upright baggage will be carried forward on a narrow belt conveyor 14 which is for example 6 inches in width, past a correcting section B for baggage which is lying flat, on to a conveyor 16 where the driven faced ploughs 15 will feed the baggage travelling on the conveyor 16 to the correct side of the pusher diverter 1 which has been suitably positioned depending upon whether a "slug" of baggage is being built up for the bottom or the shelf of the container.

Baggage lying on its side is also pushed to one side by the constant pressure controlled plough 11 so that one long side is against the conveyor side plate 12.

When a bag lying on its side reaches the correcting section 8, it will over balance and topple from the narrow belt conveyor 14 into the corrector. The corrector is a specially shaped chute 17 arranged to lower one long side of the bag onto a low level belt conveyor 18 which may be about 9 inches wide. As the bag slides down the chute it is stood up on its longer side. The blet conveyor 18 slopes upwards to feed the bag into the diverting section D on to conveyor 16 of the baggage feeder where the bag is dealt with in exactly the same way as any bag which has not passed through the corrector.

As has been described, the pusher 1, the spacer attachment 7, the back-plates 2 and the end plates 30 are carried on trolleys 19 which run on the tracks 20 mounted on the loader framework. The back plates 2 and the spacer attachment 7 may each have one end of an accumulation belt surface 3, 23 attached to them as shown in FIG. 6, the other end of each belt being fixed to a system which retracts the belts as the back plates, end plates and spacer return to the re-loading position. In one example, the belts 3, 23 rest on a series of rollers 21 forming the loading stage A as the baggage articles are fed in to build up a slug, and once the slug has been loaded, the belts are drawn back by weights 22 which will also pull back the pusher 1, spacer 7 and back plates 2 to their initial positions. Each accumulation belt 3, 23 may be wound back by a drum or pulley tensioned by a rope and fusee arrangement or by a cam in order to provide varying retardation as the plug is built up and compensating for variations in load and friction. The movement of the accumulation belts may alternatively be controlled by using torque motors.

In the correction section B1 instead of the chute 17 and inclined belt 18, the bags lying on their side may be fed to a tilted band conveyor which re-orients them into the upright condition by twisting of the belt surface before feeding them to the loader. Where desirable, the marshalling and accumulating means may include a driven or undriven belt which is provided with means to compensate for increasing weight during the formation of each slug, this belt being in addition to or instead of the accumulation belts 3, 23. Where the accumulation belts are not provided and secured to the spacer attachment or the back-plates, these parts and the pushers are returned to their initial position by other means such as springs, hydraulic or pneumatic rams or by weights and pulley arrangements.

Instad of belt ploughs in the switch section D, pushers may be provided to direct the baggage to either side of the loader, and the corrector section may be arranged to topple incorrectly oriented bags either to the left or the right depending upon the particular input arrangement adopted.

To improve loading, the containers may be tilted either laterally or endwise, and in certain cases it may be preferable to load each slug of baggage on a platform which itself may include a conveyor belt section.

In practice, of course, the baggage would not be "ideal" and safety devices would be added to give warning and, where necessary, stop the equipment if anything is likely to get into trouble. Imperative warnings, audible and visual, would be given if the equipment is so stopped.

Baggage which is obviously unsuitable for handling on this equipment could be diverted manually or automatically following a signal given from a suitable visual inspection point, such as a "check-in" desk.

We claim:

1. Article handling apparatus comprising two loading stations each provided with means to receive individual articles and discharge a plurality of said articles assembled into a group of predetermined longitudinal dimension, the second loading station extending co-linearly with the first said loading station, pusher diverter means being arranged to be movable linearly along each station, each loading station comprising an article supporting surface extending in the direction of said predetermined dimension and supporting guide means extending longitudinally parallel to said surface, each station including marshalling and accumulating means being provided with a back plate linearly displaceable along the guide means for each said station and between which and said pusher diverter means the group of articles is assembled in each station, means to guide successive articles selectively to either side of said pusher diverter means and means to discharge the assembled group of articles from each said loading station in a direction at right angles to the said predetermined dimension, wherein the marshalling and accumulating means in one of said loading stations comprise said article supporting surface, said pusher-diverter member, a spacer member and one of said back plates, said pusher-diverter member, spacer member and said one back-plate being mounted on said longitudinally extending guide means for linear movement there along, said back plate and the spacer member being provided with means to return them to one end of the guide means after each article handling sequence and the spacer member being provided with selectively releasable latch means connecting said spacer member to the pusher diverter member, said spacer member latch means being releasable at a selected point in said predetermined dimension and said spacer being interposable to said point into a group of articles being assembled in the associated station.

2. Apparatus according to claim 1 wherein the means to discharge the assembled group of articles from each loading station comprises a ram movable transversely to the longitudinal dimension of the article supporting surface.

3. Apparatus according to claim 1 wherein the article supporting surface in each loading station comprises a conveyor belt which is connected to the associated back plate, such that linear movement of said back plate along said guide means produces corresponding linear travel of said conveyor belt.

4. Apparatus according to claim 1 wherein the article supporting surface in each loading station comprises a series of rotatable members disposed on mutually parallel axes.

5. Apparatus according to claim 1 wherein measuring means are provided which are operable by said back plates over the outward end portion of their movement said measuring means being operable to compare the length said outward end portion with the corresponding dimension of an incoming article and terminating the assembly of articles in either one of said loading stations when the corresponding dimension of said incoming article is greater than the measured outward end portion of back plate movement in said one station.

6. Apparatus according to claim 1 wherein the pusher diverter means is supplied with said articles from an orienting means, said orienting means comprising a first conveyor the width of which substantially corresponds to the dimension of each said articles which forms a part of said predetermined length of each assembled group of articles and a downwardly extending inclined chute surface adjacent one side of said first conveyor, the lower edge of said inclined chute surface cooperating with an upwardly inclined second conveyor, the upstream end of which is below said first conveyor and the downstream end of which is level with the discharge end of said first conveyor.

7. Article handling apparatus comprising two loading stations each provided with means to receive individual articles and discharge a plurality of said articles assembled into a group of predetermined longitudinal dimension, the second loading station extending co-linearly with the first said loading station, pusher diverter means being arranged to be movable linearly along each station, each loading station comprising an article supporting surface extending in the direction of said predetermined dimension and supporting guide means extending longitudinally parallel to said surface, each station including marshalling and accumulating means being provided with a back plate linearly displaceable along the guide means for each said station and between which and said pusher diverter means the group of articles is assembled in each station, means to guide successive articles selectively to either side of said pusher diverter means and means to discharge the assembled group of articles from each said loading station in a direction at right angles to the said predetermined dimension, the pusher diverter means acting as a guide during discharge of the assembled group of articles.

8. Article handling apparatus comprising two loading stations each provided with means to receive individual articles and discharge a plurality of said articles assembled into a group of predetermined longitudinal dimension, the second loading station extending co-linearly with the first said loading station, pusher diverter means being arranged to be movable linearly along each station, each loading station comprising an article supporting surface extending in the direction of said predetermined dimension and supporting guide means extending longitudinally parallel to said surface, each station including marshalling and accumulating means being provided with a back plate linearly displaceable along the guide means for each said station and between which and said pusher diverter means the group of articles is assembled in each station, means to guide successive articles selectively to either side of said pusher diverter means and means to discharge the assembled group of articles from each said loading station in a direction at right angles to the said predetermined dimension, wherein the marshalling and accumulating means in one of said loading stations comprise said article supporting surface, said pusher-diverter member, a spacer member and one of said back plates, said pusher-diverter member, spacer member and said one back-plate being mounted on said longitudinally extending guide means for linear movement therealong, said back plate and the spacer member being provided with means to return them to one end of the guide means after each article handling sequence and the spacer member being provided with selectively releasable latch means connecting said spacer member to the pusher diverter member, said spacer member latch means being releasable at a selected point in said predetermined dimension and said spacer member being insertable at said point into a group of articles being assembled in the associated station, and the spacer member acts as a guide during discharge of the assembled group of articles.

* * * * *

UNITED STATES PATENT OFFICE
CERTIFICATE OF CORRECTION

Patent No. 3,838,763           Dated October 1, 1974

Inventor(s)    SYDNEY W. ROOKE et al

It is certified that error appears in the above-identified patent and that said Letters Patent are hereby corrected as shown below:

In column 1, line 8, insert

"Claims priority, application Great Britain

August 31, 1971, No. 40607/71"

Signed and sealed this 3rd day of December 1974.

(SEAL)
Attest:

McCOY M. GIBSON JR.          C. MARSHALL DANN
Attesting Officer            Commissioner of Patents